Nov. 1, 1938.  C. E. HARWOOD  2,135,126
FRICTION CLUTCH
Filed Oct. 24, 1934   2 Sheets-Sheet 1
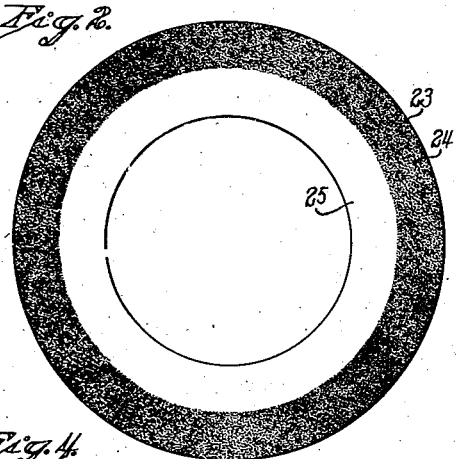
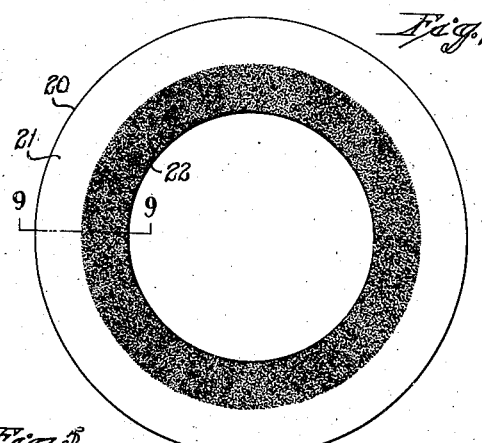
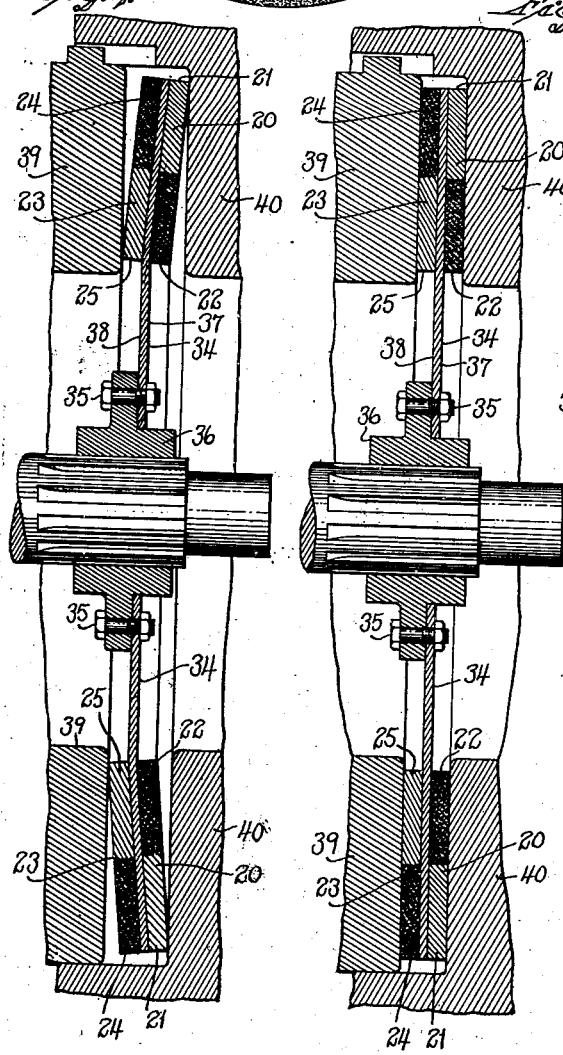
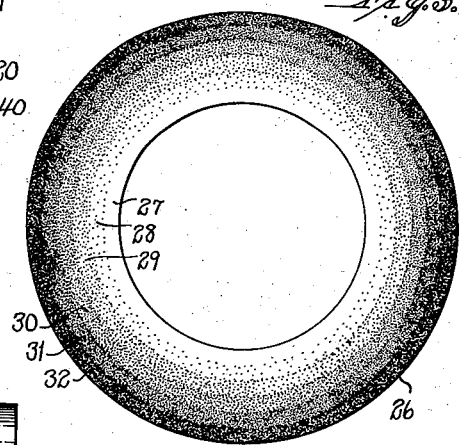
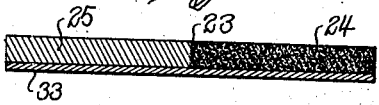

Nov. 1, 1938.   C. E. HARWOOD   2,135,126
FRICTION CLUTCH
Filed Oct. 24, 1934   2 Sheets-Sheet 2
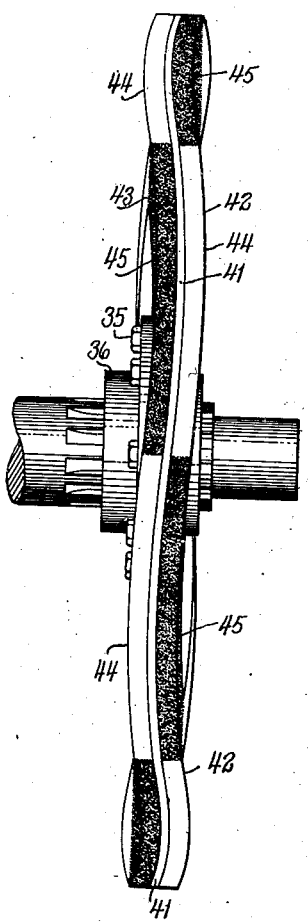
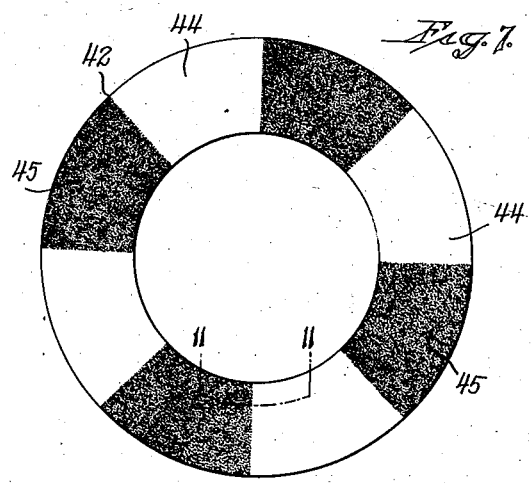
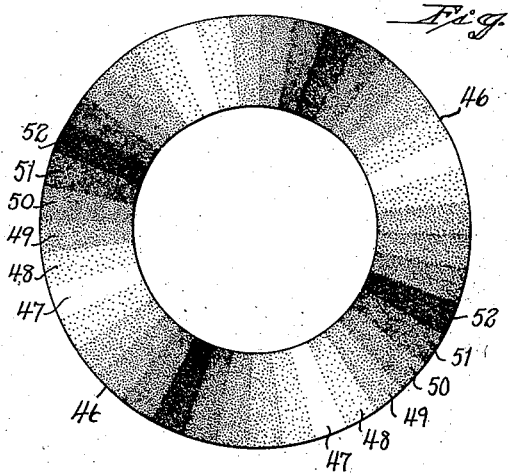
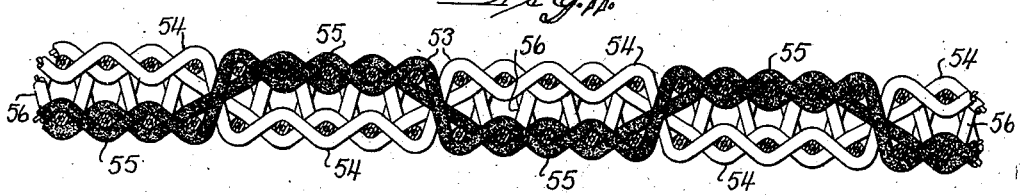
Inventor
Channing E. Harwood
Seymour Earle & Nichols
attys Patented Nov. 1, 1938

2,135,126

UNITED STATES PATENT OFFICE 2,135,126

FRICTION CLUTCH

Channing E. Harwood, Middletown, Conn., assignor to The Russell Manufacturing Company, Middletown, Conn., a corporation Application October 24, 1934, Serial No. 749,740

18 Claims. (Cl. 192—107)

This invention relates to improvements in friction-clutches.

One object of this invention is to provide an improved clutch-friction disk or facing which will be free from roughness, grabbiness or chatter.

Another object of this invention is to provide an improved clutch-friction disk or facing which will have high resistance to wear and freedom from roughness, grabbiness and chatter.

Another object of this invention is to provide an improved method of frictionally clutching two complementary members together to avoid roughness, grabbiness, chatter and wear.

With the above and other objects in view, this invention includes all improvements over the prior art which are disclosed in this application.

In the accompanying drawings, in which certain ways of carrying out the invention are shown for illustrative purposes:

Fig. 1 is a front elevation illustrating one embodiment of a clutch-friction disk or facing made in accordance with this invention, and having two concentric-rings of different friction-coefficients;

Fig. 2 is a view similar to Fig. 1, of a modified form of clutch-friction disk or facing in which the locations of the concentric-rings of different friction-coefficients are reversed as compared to their locations in Fig. 1;

Fig. 3 is a view similar to Fig. 1, of a modified form of clutch-friction disk or facing having a larger number of concentric-rings of different friction-coefficients;

Fig. 4 is a sectional view of a friction-clutch having a distortable dished plate-like carrier, on the opposite faces of which are secured friction-disks of the type shown in Figs. 1 and 2, with the clutch disengaged;

Fig. 5 is a view similar to Fig. 4, but with the clutch engaged;

Fig. 6 is an exaggerated edge elevation showing a distortable or flattenable oppositely-undulated plate-like carrier having a clutch-friction disk or facing on each of the opposite faces thereof, and adapted for use in place of the distortable dished plate-like portion of the construction shown in Fig. 3, each friction-disk having different segmental areas of different friction-coefficients;

Fig. 7 is a front elevation of a clutch-friction disk like those shown in Fig. 6;

Fig. 8 is a view similar to Fig. 7, showing a modified form of clutch-friction disk or facing having a larger number of segmental areas of different friction-coefficients;

Fig. 9 is an enlarged sectional view on the line 9—9 of Fig. 1;

Fig. 10 is a sectional view illustrating a modified form of the construction shown in Fig. 9; and Fig. 11 is a sectional view of a portion of a modified form of clutch-disk of the type shown in Fig. 7, but made of woven fabric, with the parts thereof in exaggerated relation for clearness, the section being on an enlarged scale and taken at a place similar to that indicated by line 11—11 of Fig. 7.

In the description and claims, the various parts and steps are identified by specific names for convenience, but they are intended to be as generic in their application as the prior art will permit.

In the form of the invention illustrated in Fig. 1, the clutch-friction disk or facing 20 has outer and inner rings 21 and 22 of different friction-coefficients, the outer ring 21 having a lower coefficient of friction than the inner ring 22.

In the form of the invention illustrated in Fig. 2, the friction-disk 23 has an outer ring 24 of higher friction-coefficient than the inner ring 25.

In the form of the invention illustrated in Fig. 3, the friction-disk 26 has a comparatively large number of rings 27, 28, 29, 30, 31, 32, of successively higher coefficients of friction from ring 27 to ring 32 inclusive. Thus, the friction-disk 26 is of a similar type to the friction-disk 23 (Fig. 2) but with the disk formed of a larger number of rings, whereby each two successive rings may have friction-coefficients differing but slightly from each other and thus provide a substantially continuous variation of friction-coefficient from the outer to the inner edge of the disk. The number of the rings in the disk 26 can be made greater or less, as desirable. Disks like disk 26 but with the friction-coefficients arranged in the reverse order can be made to correspond to the arrangement of rings in the disk 20 (Fig. 1).

The friction-disks formed of concentric-rings of different friction-coefficients as shown in Figs. 1, 2 and 3, may be made in various ways. The concentric-rings of separate members may be joined in abutting relation as shown in Fig. 9, or, in addition to being formed in abutting relation, they may have a backing-strip 33 (Fig. 10) secured to the back of the friction-member in any suitable way.

In producing this differential friction-coefficient or multi-tone effect on the felted or molded type by combining two or more rings of different friction-coefficients, the following procedure can be followed, for example: If it is desired to make a dual friction-coefficient ring 9⅞"x6⅛"x⅛", a ring 9⅞"x9¼"x₃₂" may be cut from stock having a friction-coefficient of, say, .20, under a given set of conditions. This stock may, for example, have been previously treated but not cured with a synthetic resin. A ring 9¹⁵⁄₆₄"x6⅛"x₃₂" may next be cut from a rubber formulation, and having a friction-coefficient of, say, .30, under the same conditions as the first ring. The two rings would then be placed concentrically in a die and pressed, molded or bonded by any suitable means. The manufacture may be completed in the customary manner. If difficulty is experienced in obtaining the proper bond because of the particular formulations used, a backing 33 (Fig. 10) may be applied to the two rings, which will assist in holding them in place during subsequent stages of manufacture. This backing may be of any suitable structure, as cloth, sheeted asbestos, metal, etc. When riveting the friction-disk or facing to the opposite faces of the plate-like carrier or member 34 (Figs. 4 and 5), the rivet-holes may be so placed as to prevent slippage between the two rings. This can be accomplished either by having rivet-holes extending through each of the two rings or by having rivet-holes extending through equal portions of the two rings through the junction of the latter.

Instead of forming the friction-members of separate rings, they may be formed integral by placing plain, untreated rings upon a suitable arbor with a spacer between each ring to permit easy access for treatment. This arbor may then be dipped to a predetermined depth in a suitable compound, and rotated slowly therein. For such compounds, a solution comprising a non-oxidizing oil, a high melting point wax, or other suitable friction-reducing ingredients may be employed to produce a friction-member having differential friction-coefficients of the nature of the friction-member illustrated in Fig. 1. Or, conversely, in order to produce a friction-member of the form shown in Fig. 2, with the outer ring of higher friction-coefficient, an asphalt, a rosin oil, or gilsonite in a suitable solvent may be used to raise the friction over that obtained with the treatment customarily employed to produce a given friction-member or facing of a single friction coefficient.

Another way of making friction-facings of the type shown in Figs. 1 and 2 is by means of using solid, woven tapes or bands, woven, for example, from asbestos yarn, preferably having a wire core. The tape is woven in the conventional manner. One edge portion of the tape may then be painted, dipped or otherwise impregnated with a compound that will produce a friction-coefficient lower than that given by the conventional treatment. The tape will then be saturated with water and wound on an annular mandrel and formed into a helix, and will be dried, cured and finished in the conventional manner, and then given a cut to separate the helix into a plurality of split-ring members of the general appearance of Figs. 1 and 2, except that they will have a split through one side, the adjacent edges of which can be connected together in the usual way. In many cases, this method will prove adequate.

Where it is necessary to grind off a considerable portion of the stock to produce a more exact finished thickness, the following is a better method: A suitable number of warp threads, depending upon the width of the lower friction area desired, are pretreated with an unctuous compound. For this purpose, a mixture of graphite, talc and light mineral oil may be used. Other ingredients known to the trade as producing low friction may, of course, be substituted. The weaving, forming, and subsequent finishing processes are carried on in the usual manner. Even better, is to pass a suitable number of warp and binder threads through a friction-reducing compound contained in a suitable pan attached to the loom, thus doing away with an additional operation. The advantage of this method over the method of dipping the edge portion of a woven tape is that the treatment is more intimately mixed with the yarn and will not be entirely removed in the grinding. Other methods will be readily apparent for obtaining this multi-tone or multi-friction effect in woven clutch-disks such, for instance, as substituting a strand of material having a different coefficient of friction from that used in the balance of the tape. By treating a plurality of groups of warp and binder threads to give them a corresponding plurality of different coefficients of friction, woven friction-disks of the type shown in Fig. 3 can be made.

In the construction shown in Figs. 4 and 5, 34 is a distortable, dished, plate-like carrier or member which is secured by bolts 35 or otherwise to a hub 36. Secured to opposite faces 37 and 38 of the member 34 are friction-members or facings 20 and 23. The friction-member 20 has the concentric-rings 21 and 22 of different coefficients of friction, and the friction-member 23 has the concentric-rings 24 and 25 of different coefficients of friction. The rings 21 and 25 may have one coefficient of friction, while the rings 22 and 24 have another coefficient of friction. The carrier 34, with the friction-disks 20 and 23, is between the pair of rotary members 39 and 40, which are splined for relative movement toward and from each other to compress and distort or straighten out the dished plate-like carrier, for example, to bring about desired clutching or coupling action between two complementary members such as a flywheel 39 and 40 and a driving-hub 36.

Where the driven-member of a clutch or other friction coupling-device shows a roughness, grabbiness or chatter in the initial stages of its engagements, the ring-portions 21 and 25 will preferably be of relatively-low coefficient of friction, whereas the ring-portions 22 and 24 will be of relatively-high coefficient of friction. Thus, when the rotary members 39 and 40 approach relatively toward one another, the dished plate-like carrier 34 carrying the friction-disks 20 and 23 will be distorted or flattened out during the progressive relative movement of members 39 and 40 toward one another, so that, initially, the low friction-coefficient rings 21 and 25 will first come into frictional operation and then, as the members 39 and 40 approach still further toward one another to further straighten the plate 34 (Fig. 5), the ring-portions 22 and 24 will be engaged in addition to the rings 21 and 25, the ring-portions 22 and 24 being of relatively-high friction-coefficient. With other types of frictional coupling-devices, the reverse may be true, that is, where rough action is experienced in the final stages of engagement. It will be obvious that in this instance, the position of the high and low friction-coefficient rings would be reversed from that previously referred to in connection with Figs. 4 and 5, so that the high friction-coefficient rings would be first engaged and then, in the final stages of engagement, the low friction-coefficient rings would also be brought into frictional engagement.

Clutches of the single-plate or twin-disk type ordinarily employ a driven-member of the offset or undulated type shown in Figs. 6 and 7. This may be made in numerous variations, the chief idea being to give a graduated engagement and a long slip period. In actual practice, with some types of undulated plates or carriers, it has been found that owing to the limited space available for the driven-member, it is impossible to provide sufficient offset or undulation without causing serious drag. This makes it difficult or impossible to shift the gears on an automobile, for example, employing this construction, and subjects the clutch-facings to abnormally high wear.

The undulated plate-like carrier 41 is secured to a hub 36 in a similar manner to that illustrated in Figs. 4 and 5 and carries upon its opposite faces two friction-disks or facings 42 and 43. The high or convex portions 44 of the friction-facings 42, 43, have one friction-coefficient, while the low or concave portions 45 of the friction-facings 42, 43, will have a different friction-coefficient. When it is desired that the initial engagement shall be one employing low friction-coefficient, in a manner similar to that described concerning the form of construction shown in Figs. 4 and 5, then the convex or high portions 44 will be of relatively-low friction-coefficient, while the low or concave portions 45 will be of relatively-high friction-coefficient, so that when the form of construction shown in Figs. 6 and 7 is employed in connection with cooperating coupling-members such as 39 and 40, the manner of operation by which the parts 39 and 40 will first engage the high portions 44, will then flatten or distort the disk 41 to also bring into frictional engagement the low portions 45. The segmental portions 44 and 45 are of sector shape in the particular form of the invention herein disclosed.

In the form of the invention illustrated in Fig. 8, the friction-disk 46 has segmental portions 47, 48, 49, 50, 51, 52 of successively higher coefficients of friction from segmental portion 47 to segmental portion 52 inclusive. Thus, the friction-disk 46 is of a similar type to friction-disk 42 (Figs. 6 and 7) but with the disk formed of a larger number of segments or segmental portions whereby each two successive segments may have friction-coefficients differing but slightly from each other and thus provide a substantially continuous variation of friction-coefficient from each of the segments 47 to segments 52. The number of the segments in the disk 46 can be made greater or less as desirable. The segmental portions 47 to 52 are sector shaped in the particular form of the invention herein disclosed.

By providing clutch-friction disks or facings which have properly-arranged distinct areas of relatively-low friction-coefficient and less grabbing effect and high wear-resistance, together with areas of relatively-high friction-coefficient with consequent high grabbing effect, though possibly of lesser wear-resistance, a very superior and long-lived clutch may be constructed by properly installing such facings. For instance, if the friction-facings are so arranged in a clutch-structure that the surfaces of relatively-low friction-coefficient engage first, while the relative motion between the parts of the clutch is greatest, such engagement will effect a smooth-acting tendency to bring the parts of the clutch into synchronism without a grabbing effect, and will be able to withstand to the maximum degree, the wear incident to their engagement when the parts of the clutch are moving relatively at maximum speed. Then, by having the surfaces of relatively-high friction-coefficient next brought into action, the relatively-moving parts of the clutch will have been brought more nearly into synchronism and the tendency of the latter friction-surfaces to occasion a grab, will be negligible and the wear imposed on the said surfaces of relatively-high friction-coefficient (and hence, lesser wear-resistance) will be minimized by the previous action of the first-mentioned surfaces of relatively-low friction-coefficient, which have discharged a preliminary task of, partially at least, synchronizing the parts of the clutch as above described.

In the form of the invention illustrated in Fig. 11, a disk 53 is formed from a woven band having two plys 54 and 55 of asbestos yarn, for example, which plys are alternately passed back and forth to form areas which extend entirely across the band and of substantial length. By making the ply 54 from a yarn having one coefficient of friction, and the ply 55 from yarn having another coefficient of friction, it is thus possible to have the face areas 54 of different coefficient of friction from the face areas 55. The manner of weaving and alternately crossing the plys 54 and 55 back and forth, to and from the opposite faces of the band 53 and connecting the plys by the binder threads 56, is known to those skilled in the art. The manner of making one of the plys of different coefficient of friction from the other ply can be accomplished in various ways, one way being to impregnate the thread to be used for one of the plys with a suitable mixture such, for example, as graphite, talc and light mineral oil, as heretofore more particularly described in connection with using woven facings of the form shown in Figs. 1 and 2. By winding the woven band into a helix and cutting the helix into rings and subjecting them to the other usual finishing processes, as previously described concerning Figs. 1 and 2, a clutch-disk or facing with differential areas, such as illustrated in Figs. 6 and 7, is produced.

Friction-disks when made in accordance with this invention, to have different friction areas of different friction-coefficients, have high resistance to wear and tend to minimize or eliminate roughness, grabbiness or chatter. And when friction-disks made in accordance with this invention are employed in the way described in connection with Figs. 4, 5, 6 and 7, roughness, grabbiness and chatter are eliminated with even greater certainty.

The invention may be carried out in other specific ways than those herein set forth without departing from the spirit and essential characteristics of the invention, and the present embodiments are therefore to be considered in all respects as illustrative and not restrictive, and all changes coming within the meaning and equivalency range of the appended claims are intended to be embraced therein.

I claim:

1. A clutch-friction disk distortable in direction transverse of its general plane and having a friction-face with different sectoral friction areas side by side circumferentially of the disk and of substantially-different friction-coefficients.

2. A clutch-friction disk distortable in direction transverse of its general plane and having a friction-face with different segmental friction areas side by side circumferentially of the disk and of substantially-different friction-coefficients, each of said segmental areas extending radially substantially-entirely across the friction-disk.

3. A clutch-friction disk having a friction-face with separated sectoral friction areas of different friction-coefficients, and one or more sectoral areas of friction-coefficient or coefficients intermediate the friction coefficients of said separated sectoral friction areas and located between said separated sectoral friction areas.

4. A clutch-friction disk having a friction-face with separated segmental friction areas of different friction-coefficients, and one or more segmental areas of friction-coefficient or coefficients intermediate the friction-coefficients of said separated segmental friction areas and located between said separated segmental friction areas, each of said segmental areas extending radially substantially-entirely across the friction-disk.

5. A friction-clutch including in combination: two complementary members to be frictionally coupled together; a distortable plate-like carrier, and a friction-member mounted on said carrier and having different friction areas of substantially-different friction-coefficients; and means for distorting said carrier and successively frictionally engaging the differential friction areas of the said friction-member with one of the said complementary members, the friction areas which first engage being of one friction-coefficient and the friction areas which later engage being of a different friction-coefficient.

6. A friction-clutch including in combination: two complementary members to be frictionally coupled together; a distortable dished plate-like carrier, and a friction-member mounted on said carrier and having different concentric friction-rings of substantially-different friction-coefficients; and means for distorting said carrier and successively frictionally engaging the differential concentric friction-rings of the said friction-member with one of the said complementary members, the rings which first engage being of one friction-coefficient and the rings which later engage being of a different friction-coefficient.

7. A friction-clutch including in combination: two complementary members to be frictionally coupled together; a distortable undulated plate-like carrier, and a friction-member mounted on said carrier and having different friction areas of substantially-different friction-coefficients; and means for distorting said carrier and successively frictionally engaging the differential friction areas of the said friction-member with one of the said complementary members, the friction areas which first engage being of one friction-coefficient and the friction areas which later engage being of a different friction-coefficient.

8. A friction-clutch including in combination: two complementary members to be frictionally coupled together; a distortable, dished, plate-like member carried by one of said complementary members; a pair of friction-members, one secured to each of opposite faces of said plate-like carrier; each friction-member having outer and inner rings of substantially-different friction-coefficients, the friction-coefficients of the outer and inner rings on one face corresponding, respectively, to the friction-coefficients of the inner and outer rings on the other face, of said plate-like carrier; and means to distort said plate-like carrier and first cause an outer ring on one face and an inner ring on the other face, and then cause an inner ring on said one face and an outer ring on said other face, of said plate-like carrier, to frictionally engage with the other of said complementary members.

9. A friction-clutch including in combination: two complementary members to be frictionally coupled together; a flattenable, oppositely-undulated, plate-like carrier carried by one of said complementary members; a pair of friction-members, one secured to each of opposite faces of said plate-like carrier; each friction-member having friction areas of substantially-different friction-coefficients, the friction areas being of considerable width in a direction radially across the friction-member and arranged annularly about the friction-member with the friction areas on the opposite high portions of the plate-like carrier of substantially-different friction-coefficient from the friction areas on the opposite low portions of the plate-like carrier; and means to flatten said plate-like member and first cause the friction areas on said high portions and then cause the friction areas on said low portions, of said plate-like carrier, to frictionally engage with the other of said complementary members.

10. A friction-clutch including in combination: two complementary members to be frictionally coupled together; a distortable, dished, plate-like member carried by one of said complementary members; a pair of friction-members, one secured to each of opposite faces of said plate-like carrier; each friction-member having outer and inner rings of substantially-different friction-coefficients, the friction-coefficients of the outer and inner rings on one face corresponding, respectively, to the friction-coefficients of the inner and outer rings on the other face, of said plate-like carrier; and means to distort said plate-like carrier and first cause an outer ring on one face and an inner ring on the other face, and then cause an inner ring on said one face and an outer ring on said other face, of said plate-like carrier, to frictionally engage with the other of said complementary members, the rings which first engage being of relatively-low friction-coefficient and the rings which later engage being of relatively-high friction-coefficient.

11. A friction-clutch including in combination: two complementary members to be frictionally coupled together; a flattenable, oppositely-undulated, plate-like carrier carried by one of said complementary members; a pair of friction-members, one secured to each of opposite faces of said plate-like carrier; each friction-member having friction areas of substantially-different friction-coefficients, the friction areas being of considerable width in a direction radially across the friction-member and arranged annularly about the friction-member with the friction areas on the opposite high portions of the plate-like carrier of substantially-different friction-coefficient from the friction areas on the opposite low portions of the plate-like carrier; and means to flatten said plate-like member and first cause the friction areas on said high portions and then cause the friction areas on said low portions, of said plate-like carrier, to frictionally engage with the other of said complementary members, the friction areas which first engage being of relatively-low friction-coefficient and the friction areas which later engage being of relatively-high friction-coefficient.

12. A friction member comprising a disk having mounted upon a face thereof a plurality of sectoral friction portions of different types, one comprising a material having characteristics of relatively-low durability and relatively-high coefficient of friction, and another having characteristics of relatively-high durability and relatively-low coefficient of friction, said different portions being alternately spaced.

13. A friction member comprising a disk having mounted upon each face thereof a plurality of sectoral friction portions, the portions on both faces having different characteristics, some having characteristics of relatively-low durability and relatively-high coefficient of friction and others having characteristics of relatively-high durability and relatively-low coefficient of friction.

14. A friction member comprising a disk having mounted on both faces thereof a plurality of sectoral friction portions of different frictional characteristics, portions having one set of frictional characteristics being alternately spaced and interspersed between portions having another set of frictional characteristics, and the portions having one set of frictional characteristics positioned on one face of the disk being disposed opposite those positioned on the other face of the disk having another set of frictional characteristics.

15. A friction member comprising a disk having mounted upon a face thereof a plurality of sectoral friction portions of different types, one comprising a material having characteristics of relatively-low durability and relatively-high coefficient of friction, and another having characteristics of relatively-high durability and relatively-low coefficient of friction.

16. A friction clutch including in combination, two complementary members to be frictionally coupled together, a distortable plate-like carrier, and a plurality of sectoral friction elements mounted on said carrier having different coefficients of friction, and means for distorting said carrier and successively frictionally engaging the different friction elements with one of said complementary members, the friction elements which first engage being of one friction coefficient and the friction elements which later engage being of a different friction coefficient.

17. A friction clutch including in combination, two complementary members to be frictionally coupled together, a distortable offset plate-like carrier, and a plurality of friction elements mounted on said carrier of substantially-different friction coefficients, and means for successively frictionally engaging the differential friction elements with one of said complementary members, the friction elements which first engage being of one friction coefficient, and the friction elements which later engage being of a different friction coefficient.

18. A friction clutch including in combination, two complementary members to be frictionally coupled together, a flattenable, oppositely-offset, plate-like carrier carried by one of said complementary members, friction portions secured to each face of said plate-like carrier, said friction portions being of substantially-different friction coefficients, the friction portions being of considerable width in a direction radially across the friction portions and arranged annularly about the plate-like carrier, with friction portions on the opposite high portions of the plate-like carrier of substantially-different friction coefficient from the friction portions on the opposite low portions of the plate-like carrier, and means to flatten said plate-like member and first cause the friction portions on said high portions and then cause the friction portions on said low portions, of said plate-like carrier, to frictionally engage with the other of said complementary members.

CHANNING E. HARWOOD.